United States Patent
Yano et al.

(10) Patent No.: US 10,331,709 B2
(45) Date of Patent: Jun. 25, 2019

(54) MAP DIFFERENCE DATA DISTRIBUTION SYSTEM, MAP DIFFERENCE DATA DISTRIBUTION DEVICE, MAP DATA MAINTAINING DEVICE, UPDATE MANAGEMENT SERVER, AND MAP DIFFERENCE EXTRACTION SERVER

(71) Applicant: DENSO CORPORATION, Kariya, Aichi-pref. (JP)

(72) Inventors: Makoto Yano, Chiryu (JP); Yasutaka Atarashi, Kariya (JP); Takamitsu Suzuki, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 778 days.

(21) Appl. No.: 14/783,274

(22) PCT Filed: Apr. 9, 2014

(86) PCT No.: PCT/JP2014/002029
§ 371 (c)(1),
(2) Date: Oct. 8, 2015

(87) PCT Pub. No.: WO2014/171110
PCT Pub. Date: Oct. 23, 2014

(65) Prior Publication Data
US 2016/0034495 A1  Feb. 4, 2016

(30) Foreign Application Priority Data
Apr. 16, 2013 (JP) .................................. 2013-085992

(51) Int. Cl.
*G01C 21/32* (2006.01)
*G06F 16/23* (2019.01)
(Continued)

(52) U.S. Cl.
CPC ............. *G06F 16/29* (2019.01); *G01C 21/32* (2013.01); *G06F 16/2365* (2019.01); *G06F 16/2379* (2019.01); *G09B 29/00* (2013.01)

(58) Field of Classification Search
CPC .................................................. G06F 17/30241
See application file for complete search history.

(56) References Cited

U.S. PATENT DOCUMENTS

| | | | |
|---|---|---|---|
| 7,403,851 B2* | 7/2008 | Kaufman | G06F 17/30241 701/451 |
| 7,930,100 B2* | 4/2011 | Tanizaki | G06F 17/30241 340/990 |

(Continued)

FOREIGN PATENT DOCUMENTS

| | | |
|---|---|---|
| CN | 103033191 A | 4/2013 |
| JP | 2006317643 A | 11/2006 |

(Continued)

OTHER PUBLICATIONS

International Search Report and Written Opinion (in Japanese with English Translation) for PCT/JP2014/002029, dated Jun. 17, 2014; ISA/JP.

*Primary Examiner* — Jeff A Burke
*Assistant Examiner* — Dawaune A Conyers
(74) *Attorney, Agent, or Firm* — Harness, Dickey & Pierce, P.L.C.

(57) ABSTRACT

A map difference data distribution system includes a map difference data distribution device including a map difference data storage unit storing map difference data items and a distribution unit distributing map difference data items, and a map data maintaining device including update unit updating map data based on map difference data items. The map difference data storage unit traces the updated data items and data items having dependent relationships with the updated data items back to the different version updates, and (Continued)

stores the data items as map difference data items. The map difference data distribution device includes a non-updated data extraction unit extracting non-updated data items from the map data maintaining device, a grouping unit grouping the data items in dependent relationships, and a distribution data generation unit generating distribution data by arranging grouped records of non-updated data items from higher priority of map element under specified communication traffic volume.

15 Claims, 8 Drawing Sheets

(51) Int. Cl.
*G06F 16/29* (2019.01)
*G09B 29/00* (2006.01)

(56) References Cited

U.S. PATENT DOCUMENTS

| | | | | |
|---|---|---|---|---|
| 2006/0106534 | A1* | 5/2006 | Kawamata | G01C 21/32 701/532 |
| 2007/0093960 | A1* | 4/2007 | Atarashi | G01C 21/32 701/450 |
| 2007/0198184 | A1* | 8/2007 | Yoshioka | G01C 21/32 701/426 |
| 2007/0208505 | A1* | 9/2007 | Fujimoto | G01C 21/32 701/451 |
| 2008/0033639 | A1* | 2/2008 | Nakamura | G01C 21/32 701/532 |
| 2008/0086262 | A1 | 4/2008 | Asahara et al. | |
| 2008/0301263 | A1* | 12/2008 | Atarashi | G01C 21/32 709/219 |
| 2011/0179080 | A1* | 7/2011 | Miyazaki | G01C 21/32 707/772 |
| 2011/0191285 | A1 | 8/2011 | Sawai | |
| 2012/0128215 | A1* | 5/2012 | Satoh | G01C 21/32 382/113 |
| 2013/0030695 | A1 | 1/2013 | Nomura et al. | |
| 2013/0031132 | A1 | 1/2013 | Nomura et al. | |
| 2013/0076766 | A1 | 3/2013 | Yamagishi | |

FOREIGN PATENT DOCUMENTS

| | | |
|---|---|---|
| JP | 2008090195 A | 4/2008 |
| JP | 2011158339 A | 8/2011 |
| JP | 2013029595 A | 2/2013 |
| WO | WO-2014171068 A1 | 10/2014 |
| WO | WO-2014171108 A1 | 10/2014 |
| WO | WO-2014171109 A1 | 10/2014 |
| WO | WO-2014171112 A1 | 10/2014 |

* cited by examiner

MAP DIFFERENCE DATA DISTRIBUTION SYSTEM, MAP DIFFERENCE DATA DISTRIBUTION DEVICE, MAP DATA MAINTAINING DEVICE, UPDATE MANAGEMENT SERVER, AND MAP DIFFERENCE EXTRACTION SERVER

CROSS REFERENCE TO RELATED APPLICATIONS

This application is a U.S. National Phase Application under 35 U.S.C. 371 of International Application No. PCT/JP2014/002029 filed on Apr. 9, 2014 and published in Japanese as WO 2014/171110 A1 on Oct. 23, 2014. This application is based on and claims the benefit of priority from Japanese Patent Application No. 2013-085992 filed on Apr. 16, 2013. The entire disclosures of all of the above applications are incorporated herein by reference.

TECHNICAL FIELD

The present disclosure relates to a map difference data distribution system that distributes map difference data items, relates to a map difference data distribution device and a map data maintaining device which are included in the map difference data distribution system, and relates to an update management server and a map difference extraction server which are included in the map difference data distribution device.

BACKGROUND ART

An art has been known for distributing a difference between map data of a version, in which map elements, for example, roads are not updated, and map data of a version, in which the map elements have been updated, as map difference data items to a vehicle navigation apparatus. A vehicle navigation apparatus, which has received the distributed map difference data items, updates the map data with the map difference data items.

For example, patent literature 1 has disclosed an art that distributes, to a vehicle navigation apparatus, map difference data items created with a map element as a unit instead of map difference data items created with a division as a unit. Herein, division is a segment into which each of layers of map data is divided. According to the technology disclosed in the patent literature 1, for map elements which have dependent relationship and to be updated, the updates of map elements in different versions of map data are traced back and the map elements are grouped in the traced back version of the map data to generate the map difference data. This configuration tries to prevent occurrence of incompatibility in a road network. What is referred to as the dependent relationship is a relationship causing a certain map element to become incompatible with other map elements unless other map elements are updated beforehand in case the certain map element is updated.

However, in the technology disclosed in patent literature 1, a communication traffic volume for distribution of map different data items may get too large. The following will describe this difficulty in detail.

After one distribution of map difference data items to a vehicle navigation apparatus and before the next distribution of the map difference data items, when multiple versions of map data items need to be updated, map difference data items including all updates of map elements that have a dependent relationship in the multiple versions need to be distributed. The larger the number of versions that have to be traced is, the larger the number of updates of map elements having the dependent relationship is. Thus, a communication traffic volume for distribution of map difference data items may get extremely large.

In case a restriction is imposed on a communication traffic volume for one distribution or on a communication traffic volume during one day or one month, when the communication traffic volume of map difference data items gets too large, the distribution of the map difference data items may be failed. Further, assume that the map difference data items are simply divided into groups so that part of the groups can be distributed under a restricted communication traffic volume. In this case, since only part of the divided map difference items is employed, updated map elements in a road network or the like become incompatible with other map elements.

The map difference data items may also be divided into smaller groups for the distribution under a predetermined communication traffic restriction. When the map difference data items are simply divided into smaller groups and distributed by multiple times, map difference data that is less necessitated by a user may be distributed prior to the map difference data that is more necessitated by the user at a higher frequency. Accordingly, update of a map element that is less necessitated by a user is performed prior to update of a map element that is more necessitated at a higher frequency.

PRIOR ART LITERATURES

Patent Literature

[Patent Literature 1] JP 2013-29595 A

SUMMARY OF INVENTION

In view of the foregoing difficulties, it is an object of the present disclosure to provide a map difference data distribution system, a map difference data distribution device, a map data maintaining device, an update management server, and a map difference extraction server in which a data size of map difference data to be distributed is reduced to conform with a restriction imposed on a communication traffic volume, a compatibility among updated map elements is maintained, and a map element that is more necessitated by a user is updated at a higher priority.

According to a first aspect of the present disclosure, a map difference data distribution system includes a map difference data distribution device and a map data maintaining device. The map difference data distribution device includes a map difference data storage unit and a distribution unit. The map difference data storage unit stores map difference data items indicating differences between data items of map elements included in a version of map data before update and data items of map elements included in a version of map data after update, and the distribution unit distributes the map difference data items. The map data maintaining device includes an update unit that updates a subject map data based on the map difference data items distributed by the distribution unit. The map difference data storage unit stores, as map difference data items, the updated data items of map elements and data items of map elements which have dependent relationships with the updated data items of map elements. The updated data items of map elements and the data items of map elements which have the dependent relationships with the updated data items of map elements are specified by tracing back to updates in different versions. The dependent relationship is a relationship in which the updated data items of map elements become incompatible with other data items of map elements unless the data items of map elements which have the dependent relationships with the updated data items of map elements are updated beforehand. The map difference data distribution device includes a non-updated data extraction unit, a grouping unit, and a distribution data generation unit. The non-updated data extraction unit extracts non-updated data items from the map difference data items stored in the map difference data storage unit, and the non-updated data items are data items of map elements that are not updated in the subject map data included in the map data maintaining device. The grouping unit groups the updated data items of map elements and the data items of map elements which have the dependent relationships with the updated data items of map elements having a same version. The distribution data generation unit generates a distribution data, which is to be distributed by the distribution unit, by arranging records, each of which is a set of the updated data items and the data items having the dependent relationships with the updated data items grouped by the grouping unit and includes the non-updated data items in the map data maintaining device, so that a total data size of the records is conformable to a specified communication traffic volume. The distribution data generation unit sequentially arranges the records corresponding to the same version in a manner that one of the records which includes the data item of map element to which a higher priority is assigned according to a priority determination condition is arranged prior to another one of the records which includes the data item of map element to which a lower priority is assigned according to the priority determination condition. The priority determination condition is a condition for determining a priority of the data item of map element. The distribution unit distributes, as the map difference data items, the distribution data generated by the distribution data generation unit.

According to the above map difference data distribution system, when a restriction is imposed on a communication traffic volume for distribution of map difference data items, a data size of map difference data to be distributed can be reduced to conform to a restriction imposed on a communication traffic volume and compatibility among updated map elements can be maintained. At the same, a map element that is more necessitated by a user can be updated at a higher priority.

A second aspect of the present disclosure provides a map difference data distribution device which is utilized in the map difference data distribution system according to the first aspect of the present disclosure.

According to the map difference data distribution device, the same advantages as those of the map difference data distribution system according to the first aspect can be provided.

A third aspect of the present disclosure provides a map data maintaining device which is utilized in the map difference data distribution system according to the first aspect of the present disclosure.

According to the map data maintaining device, the same advantages as those of the map difference data distribution system according to the first aspect can be provided.

A fourth aspect of the present disclosure provides an update management server which is utilized in the map difference data distribution system according to the first aspect of the present disclosure.

According to the update management server, the same advantages as those of the map difference data distribution system according to the first aspect can be provided.

A fifth aspect of the present disclosure provides a map difference extraction server which is utilized in the map difference data distribution system according to the first aspect of the present disclosure.

According to the map difference extraction server, the same advantages as those of the map difference data distribution system according to the first aspect can be provided.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

The following will describe a first embodiment of the present disclosure with reference to the drawings.

1. Map Difference Data Distribution System 100

Figure 1:
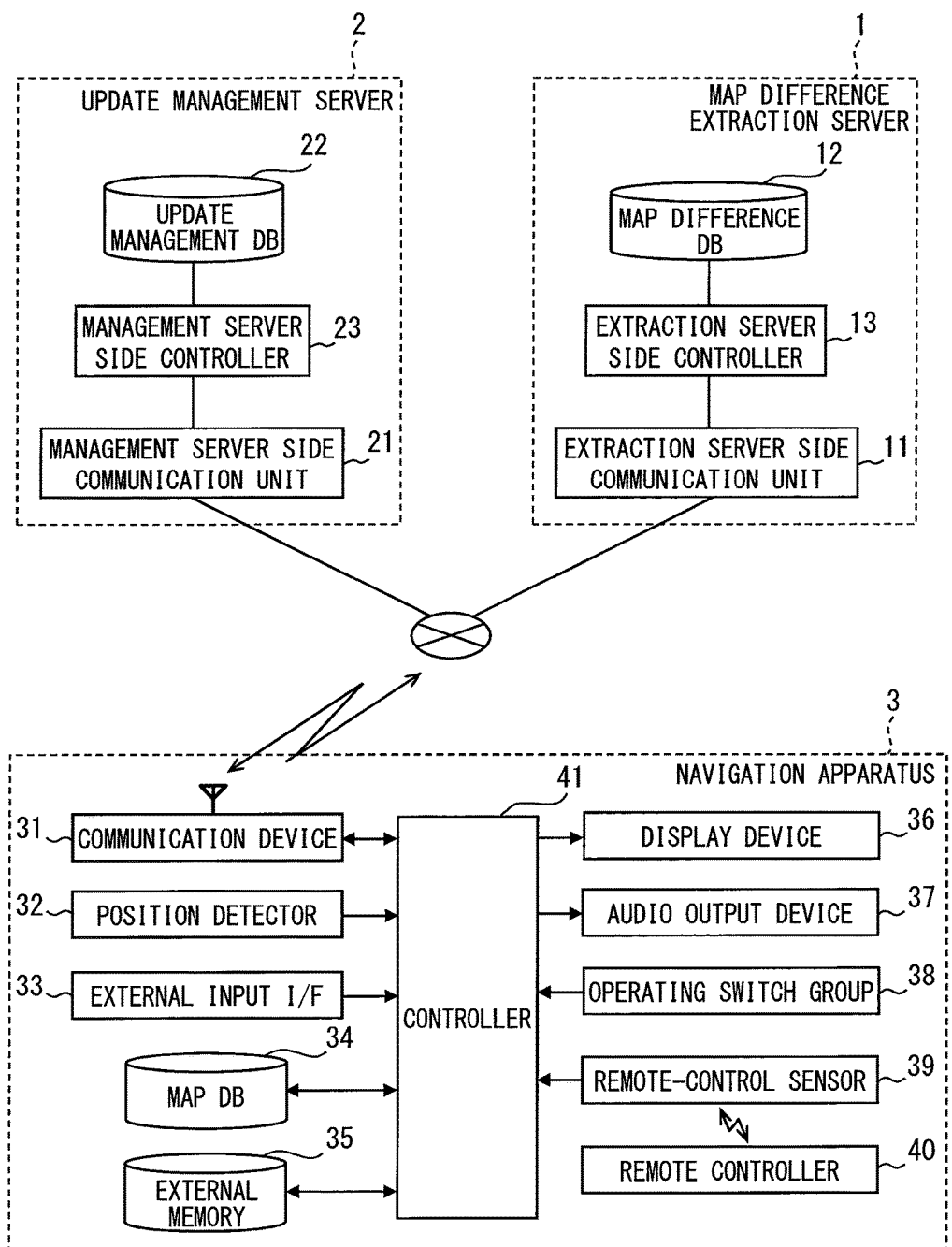
FIG. 1 is a diagram showing an example of an outline configuration of a map difference data distribution system in accordance with an embodiment of the present disclosure.

FIG. 1 shows an example of an outline configuration of a map difference data distribution system 100 to which the present disclosure is applied. The map difference data distribution system 100 shown in FIG. 1 includes a map difference extraction server 1, an update management server 2, and a navigation apparatus 3. The map difference extraction server 1 and update management server 2 correspond to a map difference data distribution device.

2. Map Difference Extraction Server 1

As shown in FIG. 1, the map difference extraction server 1 includes an extraction server side communication unit 11, a map difference database (DB) 12, and an extraction server side controller 13. The extraction server side communication unit 11 communicates with the update management server 2 or the navigation apparatus 3 over a communication network.

The map difference database 12 stores map difference data items. The map difference database 12 corresponds to a map difference data storage unit. Map difference data is part of map data (data of base map) which need to be updated. The map data represents dispositions of map elements in the map. Therefore, the map difference data is data of a map element whose disposition has to be changed from a base map.

A map element may be provided by, for example, a road, point of interest (POI), background, and characters describing a place name or the like. Map data includes, for example, road data items each including node data items and link data items, background data items each representing a geography, character data items based on which place names or the like are displayed, and POI data items indicating various facilities. The map difference database 12 stores map difference data items provided by an external server, which is not shown. The map difference data items will be detailed later.

The link data item includes information indicating a specific number (link ID) for specifying a link, a length the link, coordinates (latitudes and longitudes) of leading node and terminating node of the link, a road name, a road type, a road width, the number of lanes, presence of a dedicated lane for right turn purpose or left turn purpose, the number of dedicated lanes, and a speed limit. Node data item includes information indicating a node ID that is a specific number assigned to each of nodes in a map, node coordinates, a node name, a connection link ID that is a link ID of a link connected to the node, and a type of intersection corresponding to the node. The road type may be one of an expressway, national highway, prefectural highway, and local street. Alternatively, the road type may be one of a public superhighway, a public fast highway, a national highway, a provincial highway, a prefectural highway, rural street, and local street.

Figure 2:
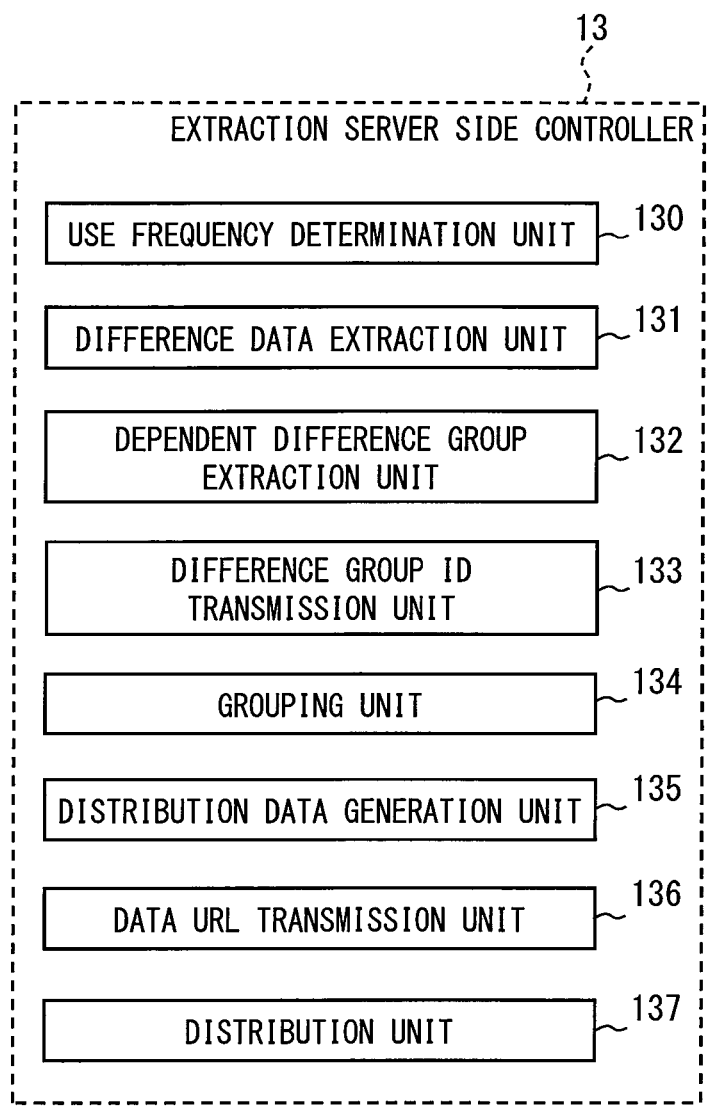
FIG. 2 is a functional block diagram showing an example of an outline configuration of an extraction server side controller of a map difference extraction server.

The extraction server side controller 13 is provided by a microcomputer that includes a CPU, a ROM, a RAM, a backup RAM, and input/output interfaces (not shown). The extraction server side controller 13 performs various processes by executing various control programs, which are stored in the ROM, on the basis of various pieces of information inputted from the extraction server side communication unit 11. The extraction server side controller 13 includes, as shown in FIG. 2, as functional blocks, a use frequency determination unit 130, a difference data extraction unit 131, a dependent difference group extraction unit 132, a difference group ID transmission unit 133, a grouping unit 134, a distribution data generation unit 135, a data URL transmission unit 136, and a distribution unit 137. Process to be performed by the extraction server side controller 13 will be detailed later.

2-1. Map Difference Data

The following will describe map difference data items to be stored in the map difference database 12. A Map difference data item is a data that indicates a difference between map data of a version, in which data items of map elements are not updated, and map data of a version in which the data items of map elements have been updated. The version in which the data items of map elements are not updated is also referred to as a pre-update version, and the version in which the data items of map elements have been updated is also referred to as a post-update version. In other words, the difference between the pre-update version and the post-update version refers to data items of map elements updated into the post-update version. For example, updating of a map element is caused by an opening or closing of a road, or an addition or deletion of a facility. The map difference data items shall be managed in units of, for example, a rectangular division that is one of segments into which the map data is divided. Each of the divisions is assigned with a division ID.

For example, some map difference data items may be included in one data group (hereinafter, difference group) having a specific ID (hereinafter, difference group ID). That is, the difference group includes updated data items for each update version of the map data. Herein, the difference group IDs are sequentially assigned to multiple difference groups. For example, the difference group may be a group including link data items and node data items when the updated map element is a road segment having an intersection. Herein, the link data items and node data items indicate the road segment. As another example, when an updated map element is a facility, the difference group is a group including POI data item and character data item, which indicate the facility.

Map difference data items include a data item indicating a dependent relationship between map elements. The data item indicating the dependent relationship may be stored in a memory other than the map difference database 12. When generating the map difference data, the map difference data may be generated according to a known method. For example, the one example of the known method may be a method disclosed in patent literature 1. The dependent relationship will be described below.

2-2. Dependent Relationship

A dependent relationship refers to a relationship that causes a certain map element (hereinafter, a first map element) to become incompatible with another map element (hereinafter, a second map element) unless data of another map element is updated beforehand in case data of the certain map element is updated. The following will describe the dependent relationship in detail with reference to FIG. 3. In the following, a description will be made about the dependent relationship of map difference data items in a case where the map data is updated from initial version to second version, and then from the second version to the third version as shown in FIG. 3.

Figure 3:
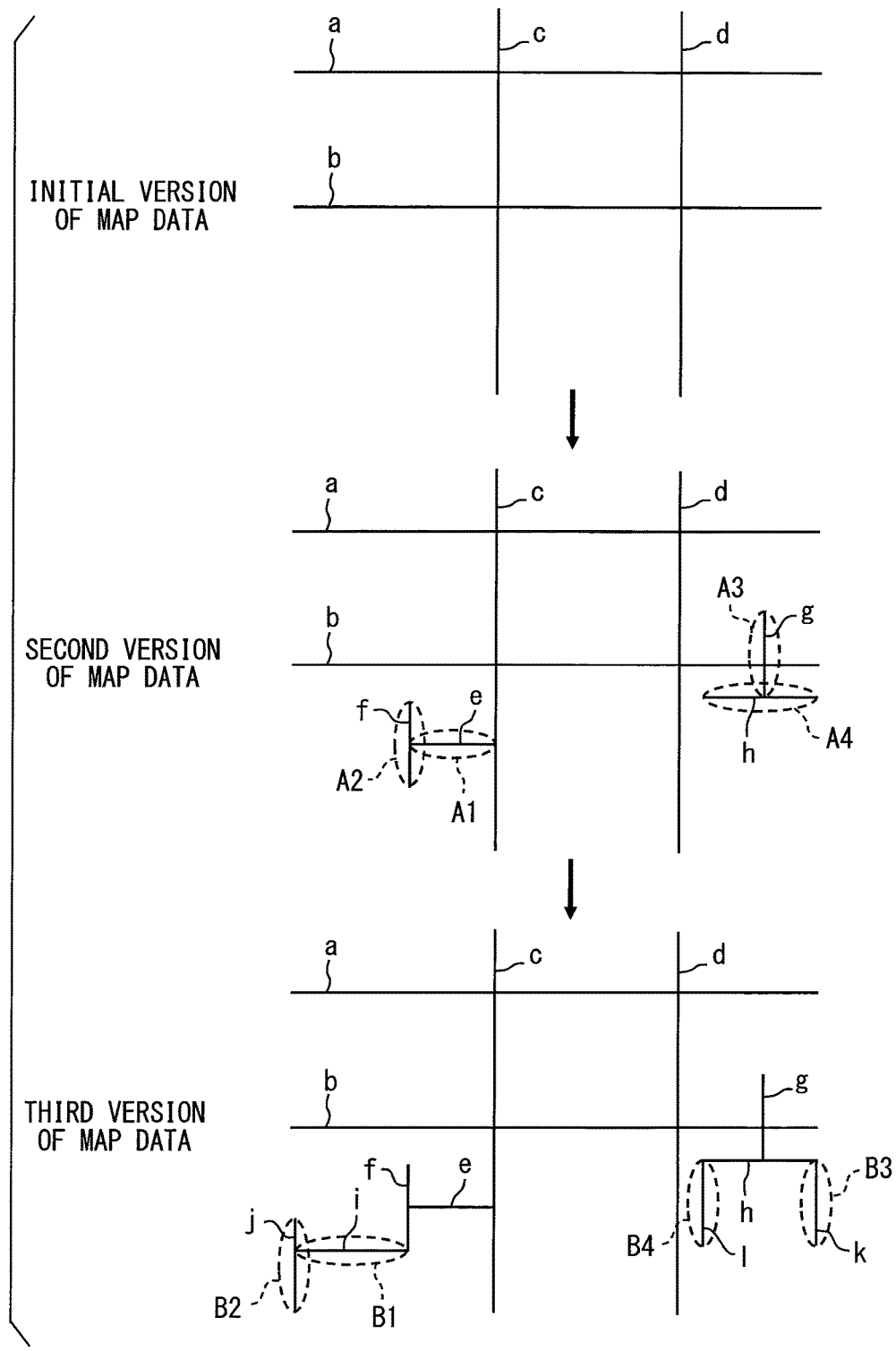
FIG. 3 is a diagram showing an example of a map data change.

In a case where road segments a to d exist from the beginning of generation of map data of initial version, the map data of initial version includes the road segments a to d as shown in FIG. 3. When road segments e to h are newly opened, map data in which the addition of the road segments e to h is reflected on the initial version is generated as second version. Hereinafter, a group of data items related to the road segment e, which is an updated map element, is referred to as a difference group A1. A group of data items related to the road segment f is referred to as a difference group A2. A group of data items related to the segment g is referred to as a difference group A3. A group of data items related to the road segment h is referred to as a difference group A4.

As shown in FIG. 3, the road segment e is newly opened to be branched out of the road segment c, and the road segment f is newly opened based on the road segment e. The road segment g is newly opened to intersect the road segment b, and the road segment h is newly opened based on the road segment g.

Further, in a case where road segments i to l are newly opened, map data in which the addition of the road segments i to l is reflected on the map data of second version is generated as the third version. A group of data items related to the road segment I, which is an updated map element, is referred to as a difference group B1, a group of data items related to the road segment j is referred to as a difference group B2, a group of data items related to the road segment k is referred to as a difference group B3, and a group of data items related to the road segment l is referred to as a difference group B4.

As shown in FIG. 3, the road segment i is newly opened based on the road segment f, the road segment j is newly opened based on the road segment i, the road segments k and l are newly opened based on the road segment h.

Among map elements updated in the map data of second version, the road segment f would be isolated from other road segments without an addition of the road segment e. Therefore, the road segments f and e have a dependent relationship that allows the road segment f to depend on the road segment e as a dependence destination. Therefore, the difference group A1 and difference group A2 have the dependent relationship. Hereinafter, the dependence destination is referred to as a parent, and an object that depends on the dependence destination is referred to as a child. When the dependent relationship between the difference group A1 and difference group A2 is expressed with the terms of parent and child, the difference group A1 is the parent and the difference group A2 is the child.

Among the map elements updated in the map data of second version, the road segment h would be isolated from other road segments unless the road segment g has been added. Therefore, the road segments h and g have a dependent relationship that allows the road segment h to depend on the road segment g as a dependence destination. Accordingly, the difference groups A3 and A4 have the dependent relationship that relates the difference group A3 to a parent and the difference group A4 to a child.

Among map elements updated in the map data of third version, the road segment i would be isolated from other road segments unless the road segment f, which is an updated map element in the map data of second version, has been added. Therefore, the road segments f and i have a dependent relationship over two different versions. In this dependent relationship, the road segment i added in the third version depends on the road segment f added in the second version as a dependence destination. Accordingly, the difference groups A2 and B1 have the dependent relationship in which the difference group A2 corresponds to a parent and the difference group B1 corresponds to a child.

Among the map elements updated in the map data of third version, the road segment j would be isolated from other road segments unless the road segment i has been added. Therefore, the road segments i and j have a dependent relationship in which the road segment j depends on the road segment i as a dependence destination. Accordingly, the difference groups B1 and B2 have the dependent relationship in which the difference group B1 corresponds to a parent and the difference group B2 corresponds to a child.

Among the map elements updated in the map data of third version, the road segments k and l would be isolated from other road segments unless the road segment h, which is a map element updated in the map data of second version, has been added. Therefore, the road segments k and l and the road segment h have a dependent relationship over two different versions. In this dependent relationship, the road segments k and l depend on the road segment h as a dependence destination. Accordingly, the difference group A4 and the difference groups B3 and B4 have the dependent relationship in which the difference group A4 corresponds to a parent and the difference groups B3 and B4 correspond to children. The difference groups B3 and B4 do not have the dependent relationship with one another.

Figure 4:
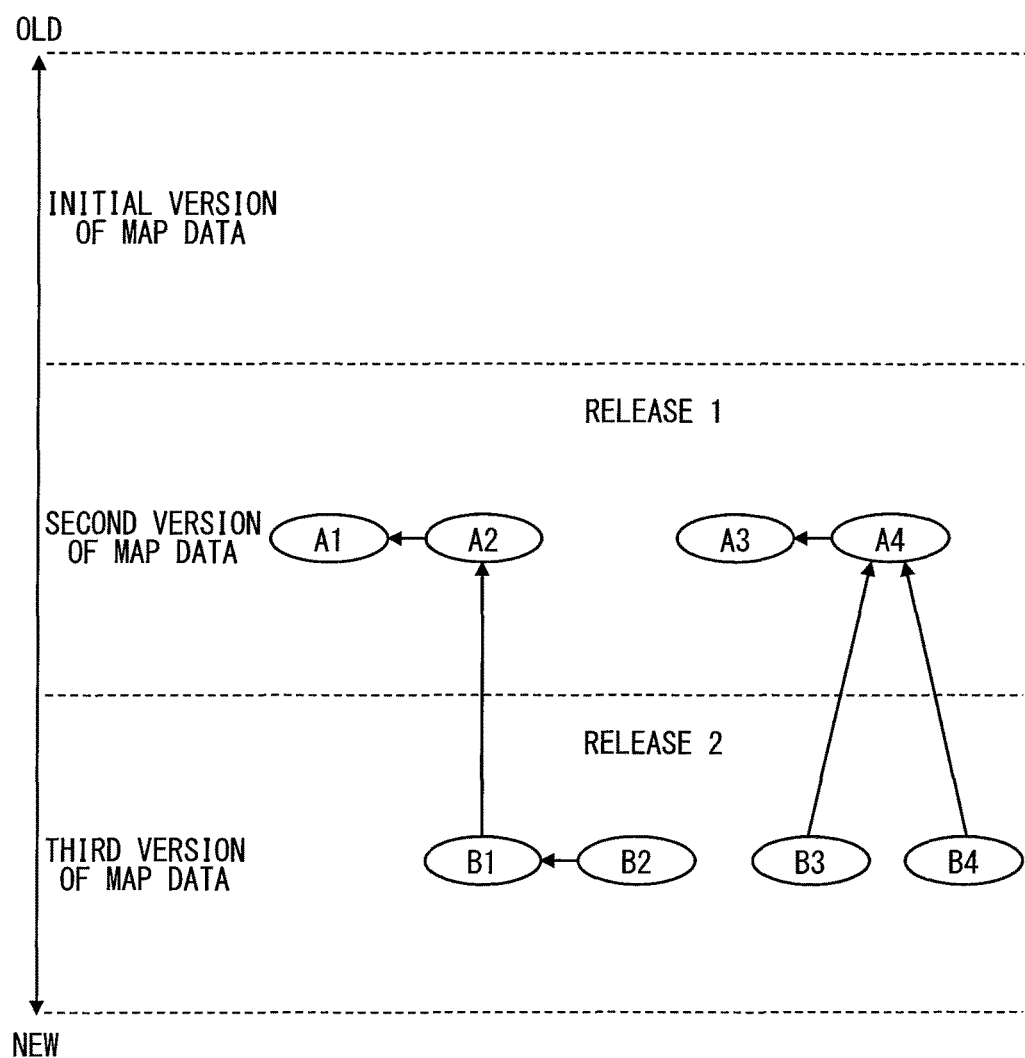
FIG. 4 is a diagram showing an example of a dependent relationship between map elements.

As shown in FIG. 4, the relationships of dependency among the difference groups A1 to A4 and B1 to B4 are concerned with difference groups in different versions. More particularly, the road segments shown in FIG. 3 include three different relationships of dependency that are established as A1-A2-B1-B2, A3-A4-B3, and A3-A4-B4. In these dependent relationships, former is a parent and latter is a child. Each of map difference data items to be stored in the map difference database 12 includes information related to the dependent relationship.

A unit of a set of difference groups in the same version is referred to as a release. The releases are counted as the first-time release, second-time release, and so on in chronological order of a version. A set of difference groups that represent map elements updated in the map data of second version is release 1 whose release time is the first time. A set of difference groups that represent map elements updated in the map data of third version is release 2 whose release time is the second time. Release 1 includes the difference groups A1 to A4, and release 2 includes the difference groups B1 to B4.

Referring to FIG. 3, a dependent relationship has been described on the assumption that road segments are updated as map elements. The same applies to any map element other than the road segment. For example, when a facility is updated as a map element, when the facility would be isolated from other map elements unless a road segment on which the facility exists had been updated beforehand, the facility and road segment have a dependent relationship. When guidance data signifying that image data is displayed in a certain place is updated as a map element, when the guidance data would be incompatible with the image data unless the image data which the guidance data employs had been updated beforehand, the guidance data and image data have a dependent relationship.

3. Update Management Server 2

As shown in FIG. 1, the update management server 2 includes a management server side communication unit 21, an update management database 22, and a management server side controller 23. The management server side communication unit 21 communicates with the map difference extraction server 1 or with the navigation apparatus 3 over a communication network.

The update management database 22 stores determination reference information for use in determination of map difference data items which have been distributed from the map difference extraction server 1 to the navigation apparatus 3. The update management database 22 corresponds to a determination reference information storage unit.

As determination reference information, for example, version information related to a version that has been distributed to the navigation apparatus 3 is stored. This is because, once the version information related to the version that has been distributed is determined, difference groups that have been distributed can be determined. Difference group IDs of difference groups that have been distributed are also stored in the update management database 22. For example, as the version information, the number of release times can be employed. The following will describe an example in which the number of release times is adopted as the version information. The number of release times that has been distributed may be considered as the number of release times including map elements all of which has already been distributed. When there are multiple navigation apparatuses 3, the update management database 22 stores the determination reference information in association with the user of each of the navigation apparatuses 3.

As the determination reference information that is referred in determining of the map difference data items have been distributed, a flag may be set for each of difference groups (that is, map difference data items) that have been distributed. Whether a difference group has been distributed or not may be determined by identifying the flag.

Figure 5:
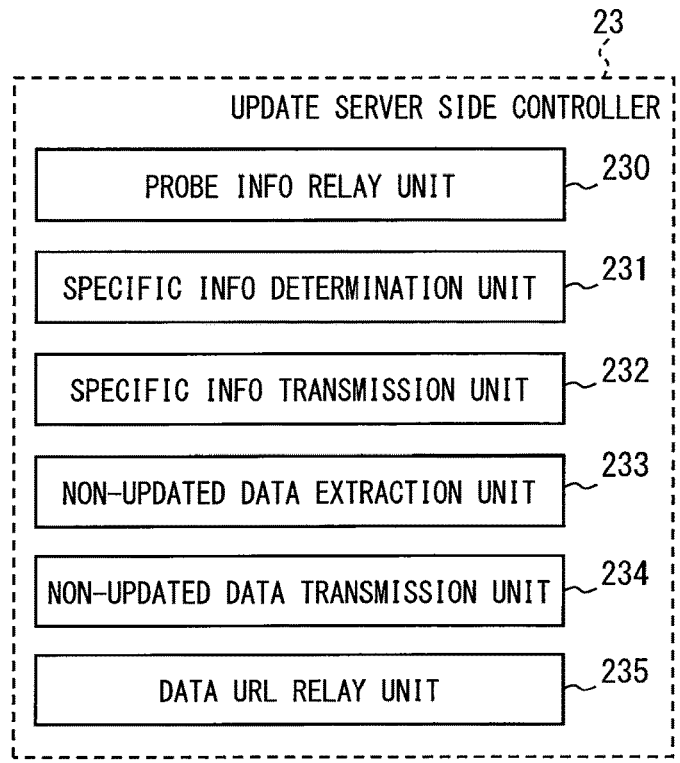
FIG. 5 is a functional block diagram showing an example of an outline configuration of a management server side controller of an update management server.

The management server side controller 23 is provided by a microcomputer that includes a CPU, a ROM, a RAM, a backup RAM, and input/output interfaces (not shown). The management server side controller 23 performs various processes by executing various control programs, which are stored in the ROM, on the basis of various pieces of information transmitted from the management server side communication unit 21 or from the update management database 22. As shown in FIG. 5, the management server side controller 23 includes, as functional blocks, a probe information relay unit 230, a specific information determination unit 231, a specific information transmission unit 232, a non-updated data extraction unit 233, a non-updated data transmission unit 234, and a data URL relay unit 235. The following will describe processes to be performed by the management server side controller 23.

4. Navigation Apparatus 3

Referring back to FIG. 1, the navigation apparatus 3 may be an onboard navigation apparatus or a handheld navigation apparatus capable of being carried into a vehicle. In case the navigation apparatus 3 is a handheld type, the navigation apparatus 3 may be designed to be used during a travel of a vehicle. Herein, vehicle may include an automobile, motorcycle, or bicycle. The navigation apparatus 3 may also be designed to be used during walking of a user who carries the navigation apparatus 3 with him/her. The following will describe an example in which the onboard navigation apparatus is adopted as the navigation apparatus 3.

When a handheld device is adopted as the navigation apparatus 3 and information is to be acquired from a system such as an onboard LAN system of a vehicle, the navigation apparatus 3 acquires the information by performing known wireless communication with the system such as the onboard LAN system of the vehicle under the Bluetooth (registered trademark) protocol or performing wired communication using a USB or the like with the system such as the onboard LAN system of the vehicle.

The following will describe an outline configuration of the navigation apparatus 3. As shown in FIG. 1, the navigation apparatus 3 includes a communication device 31, a position detector 32, an external input interface (I/F) 33, a map database 34, an external memory 35, a display device 36, an audio output device 37, an operating switch group 38, a remote-control terminal (hereinafter, remote controller) 39, a remote-control sensor 40, and a controller 41.

The communication device 31 communicates with the map difference extraction server 1 and the update management server 2 over the communication network. As the communication device 31, any kind of device including, for example, an onboard communication module can be adopted. For example, a data communication module (DCM) employed in telematics communication may be provided as the onboard communication module.

The position detector 32 includes a known acceleration sensor, a gyroscope, and a receiver for receiving signals from a satellite positioning system such as a global positioning system (GPS). The GPS system detects the position of the own device on the basis of radio waves transmitted from satellites. The position detector 32 sequentially detects the current position of a user of the own device (hereinafter, a user position). For example, the user position may be indicated with coordinates including a latitude and longitude. The position detector 32 may be provided by a part of the above-described sensors or may be provided separated from the above-described sensors.

The external input interface 33 is an interface via which the controller 41 acquires information related to the vehicle state from an ECU or a sensor equipped to the vehicle. For example, the external input interface 33 receives the information related to the vehicle state from the ECU or sensor, which is equipped to the vehicle, over an onboard LAN or the like, and provides the information to the controller 41. As an example of the information related to the vehicle state, a signal indicating the on state or off state of an accessory (ACC) power supply may be used.

The map database 34 is stored in a memory card, for example, an SD card. The map database 34 stores map data items included in, for example, the aforesaid map data of initial version. For example, the controller 41 may download the map data to be stored in the map database 34 from a center, which is not shown, via the communication device 31. The map data is acquired and stored in the map database 34 in advance.

The external memory 35 is a writable storage. The external memory 35 can be used to store a large amount of data or data that is required to be maintained even when a power supply is turned off. The external memory 35 copies data, which is used frequently, from the map database 34 in order to use the data. The external memory 35 may be a removable memory having a relatively small storage capacity. The map database 34 may be stored in the external memory 35.

The display device 36 can achieve, for example, full-color display. The display device 36 may be provided by a liquid crystal display, an organic EL display, a plasma display, or the like. The audio output device 37 is provided by a loudspeaker or the like and outputs guidance voice in response to an instruction output from the controller 41.

The operating switch group 38 may be provided by touch switches integrated with the display device 36 or mechanical switches integrated with the display device 36. Manipulations made to the switches instruct the controller 41 to carry out various kinds of operations. The remote controller is provided with multiple operating switches (not shown). By maneuvering the switches, various command signals are sent to the controller 41 via the remote-control sensor 40. Thus, the controller 41 can carry out the operations corresponding to the manipulation made to the remote controller 39 similarly to the operations corresponding to the manipulation made to the operating switch group 38.

Figure 6:
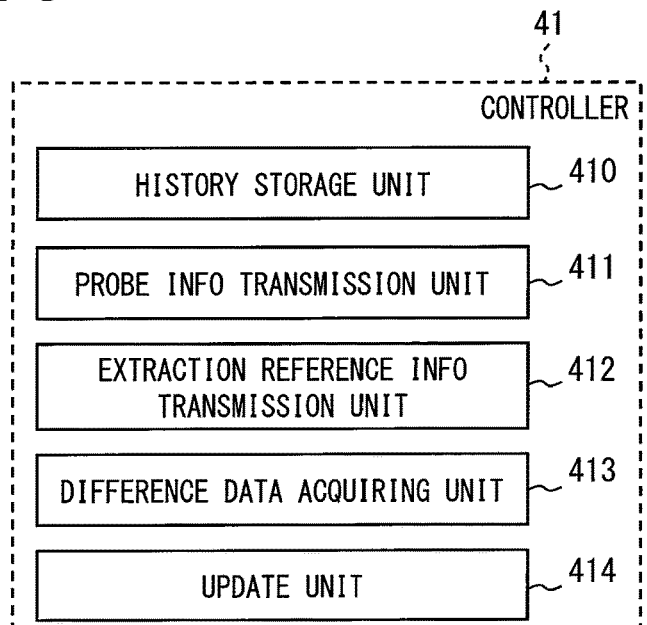
FIG. 6 is a functional block diagram showing an example of an outline configuration of a controller of a navigation apparatus.

The controller 41 is provided by a microcomputer that includes a CPU, a ROM, a RAM, and a backup RAM. The controller 41 performs various processes on the basis of various kinds of information transmitted from the communication device 31, the position detector 32, the external input interface 33, the map database 34, the external memory 35, the operating switch group 38, and the remote-control sensor 39. As shown in FIG. 6, the controller 41 includes, as functional blocks, a history storage unit 410, a probe information transmission unit 411, an extraction reference information transmission unit 412, a difference data acquiring unit 413, and an update unit 414. Processes to be performed by the controller 41 will be described later.

The history storage unit 410 stores information related to the road segment (hereinafter, travel segment) or an area (hereinafter, travel area) over which the subject vehicle has traveled. The travel area is, for example, part of a mesh or an administrative district in which the road segment over which the subject vehicle has traveled is included. The specifying of the travel segment or travel area may be carried out using a known method. The history storage unit 410 may store information related to the facility which is selected as a destination or a via point (hereinafter, a user-selected facility). The history storage unit 410 may be an area in which a map element utilized by an application that utilizes a map element is included (hereinafter, an application use map area). The application use map area may be part of a mesh or an administrative district in which the map element utilized by an application is included.

5. Acquiring Probe Information

Figure 7:
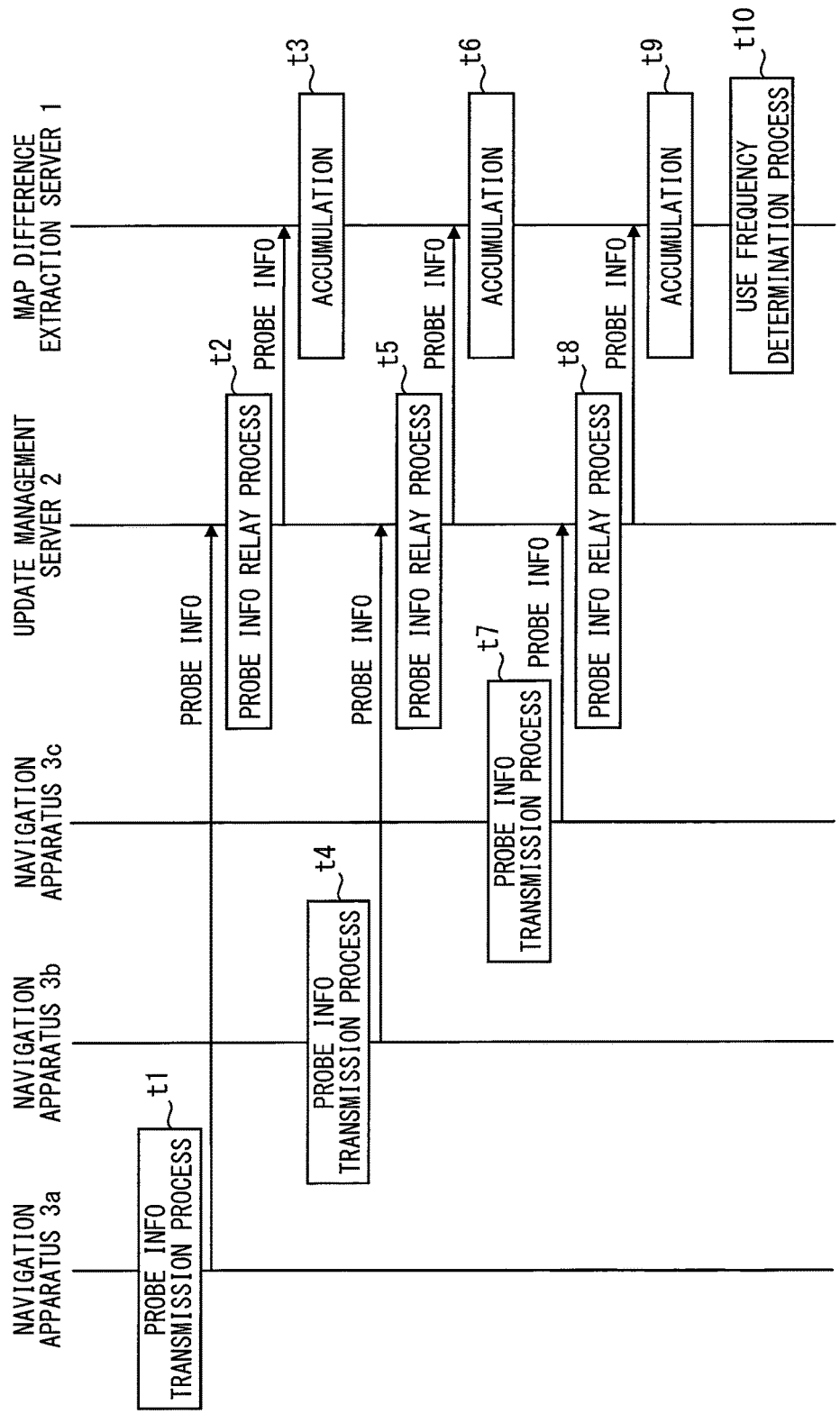
FIG. 7 is a sequence diagram showing an example of a process which is executed by a map difference data distribution system for determining a use frequency of a map element by collecting probe information from multiple navigation apparatuses.

The following will describe a flow of process for determining a use frequency of a map element by collecting pieces of probe information from multiple navigation apparatus 3, which is followed by the map difference data distribution system 100, with reference to a sequence diagram shown in FIG. 7. The following will describe an example in which, as the navigation apparatus 3, three navigation apparatuses 3a, 3b, and 3c are equipped to respective three vehicles.

t1. Probe Information Transmission Process (Navigation Apparatus 3a)

The probe information transmission unit 411 of the controller 41 of the navigation apparatus 3a performs probe information transmission process (t1). The probe information transmission process is performed in response to a detection of a predetermined trigger. The predetermined trigger is, for example, turning on of the ACC power supply of a subject vehicle. Turning on of the ACC power supply of the subject vehicle may be detected based on a signal representing the on state or off state of the ACC power supply acquired via the external input interface 33.

In probe information transmission process, information related to the travel segment, travel area, user-selected facility, or application use map area is transmitted as probe information to the update management server 2 via the communication device 31. Herein, the information related to the travel segment, travel area, user-selected facility, or application use map area is stored in the history storage unit 410 of the subject vehicle.

t2. Probe Information Relay Process (Update Management Server 2)

When the management server side controller 23 of the update management server 2 receives the probe information, which is transmitted from the navigation apparatus 3a, via the management server side communication unit 21, the probe information relay unit 230 of the management server side controller 23 performs probe information relay process (t2). In the probe information relay process, the received probe information is transmitted to the map difference extraction server 1 via the management server side communication unit 21.

t3. Accumulation (Map Difference Extraction Server 1)

When the extraction server side controller 13 of the map difference extraction server 1 receives the probe information of the navigation apparatus 3a, which is transmitted from the update management server 2, via the extraction server side communication unit 11, the extraction server side controller 13 accumulates the probe information in a nonvolatile memory (t3). Herein, the nonvolatile memory is provided by a memory having a large storage capacity such as an HDD.

t4. Probe Information Transmission Process (Navigation Apparatus 3b)

The probe information transmission unit 411 of the controller 41 of the navigation apparatus 3b performs probe information transmission process similar to the aforesaid probe information transmission performed by the navigation apparatus 3a (t4).

t5. Probe Information Relay Process (Update Management Server 2)

When the management server side controller 23 of the update management server 2 receives probe information, which is transmitted from the navigation apparatus 3b, via the management server side communication unit 21, the probe information relay unit 230 of the management server side controller 23 performs probe information relay process in a similar manner as the aforesaid relay process (t5).

t6. Accumulation (Map Difference Extraction Server 1)

When the extraction server side controller 13 of the map difference extraction server 1 receives probe information of the navigation apparatus 3b, which is transmitted from the update management server 2, via the extraction server side communication unit 11, the extraction server side controller 13 accumulates the probe information in a nonvolatile memory in a similar manner as the aforesaid accumulation (t6).

t7. Probe Information Transmission Process (Navigation Apparatus 3c)

The probe information transmission unit 411 of the controller 41 of a navigation apparatus 3c performs probe information transmission process a similar manner as the aforesaid probe information transmission process (t7).

t8. Probe Information Relay Process (Update Management Server 2)

When the management server side controller 23 of the update management server 2 receives probe information, which is transmitted from the navigation apparatus 3c, via the management server side communication unit 21, the probe information relay unit 230 of the management server side controller 23 performs probe information relay process in a similar manner as the aforesaid relay process (t8).

t9. Accumulation (Map Difference Extraction Server 1)

When the extraction server side controller 13 of the map difference extraction server 1 receives probe information of the navigation apparatus 3c, which is transmitted from the update management server 2, via the extraction server side communication unit 11, the extraction server side controller 13 accumulates the probe information in a nonvolatile memory in a similar manner as the aforesaid accumulation (t9).

FIG. 7 shows a configuration in which the navigation apparatus 3a, navigation apparatus 3b, and navigation apparatus 3c perform probe information transmission process in an order of 3a, 3b, to 3c. The present disclosure is not limited to this configuration. The order of the navigation apparatuses may be modified. The following will describe an example in which navigation apparatuses 3a, 3b, and 3c are employed in three vehicles with reference to FIG. 7. The present disclosure may be applied to one or more navigation apparatuses 3 employed in one or more vehicles other than three vehicles.

t10. Use Frequency Determination Process (Map Difference Extraction Server 1)

The use frequency determination unit 130 of the extraction server side controller 13 of the map difference extraction server 1 performs use frequency determination process (t10). The use frequency determination process may be performed at a specified interval. The use frequency determination process may also be performed each time the extraction server side controller 13 accumulates new probe information in a nonvolatile memory.

In use frequency determination process, statistical processing is performed on pieces of probe information of the navigation apparatus 3a, 3b, and 3c, which are accumulated in a nonvolatile memory, in order to determine the use frequency of each map element. The use frequencies of map elements determined in the use frequency determination process are linked to map difference data items in the map difference database 12. More particularly, the use frequencies are linked to difference groups, which include the map elements whose use frequencies have been determined, out of the difference groups included in the map difference database 12.

For example, when the probe information represents a travel segment, the number of times by which each vehicle has traveled the road segment is determined as a use frequency of a map element. Herein, the number of times by which each vehicle has traveled the road is calculated by the statistical processing. The number of times by which each vehicle has traveled a road segment may be a sum total of times including the number of times by which the same user has repetitively traveled the same road segment. The number of times by which each vehicle has traveled a road segment may be the number of times that does not include the number of times by which the same user has traveled the same road segment for the second time and subsequent times.

When the probe information represents a travel area, the number of times by which each vehicle has traveled over the area is determined as a use frequency of a map element included in the area. The number of times by which each vehicle has traveled over the area is calculated by the statistical processing. Herein, the area is part of a mesh or an administrative district. The number of times by which each vehicle has traveled over the area may be a sum total of times or may be the number of times that does not include the number of times by which the same user has traveled over the area for the second time and subsequent times.

When probe information represents a user-selected facility, the number of times by which the facility has been selected as destination or as via point is determined as a use frequency of a map element. The number of times by which the facility has been selected as destination or as via point is calculated by the statistical processing. The number of times by which a facility has been selected may be a sum total of times or the number of times that does not include the number of times by which the same user has selected a facility for the second time and subsequent times.

When probe information represents an application use map area, the number of times by which the application use map area is used by the user is determined as a use frequency of a map element included in the application use map area. The number of times by which the application use map area is used by the user is calculated by the statistical processing. The number of times by which an application use map area is used may be a sum total of times or the number of times that does not include the number of times by which the same user has used the application use map area for the second time and subsequent times.

Transmission of pieces of probe information from the navigation apparatuses 3a, 3b, and 3c may be performed together with transmission of extraction reference information to be performed in the extraction reference information transmission process.

6. Flow of Process in Map Difference Data Distribution System 100

Figure 8:
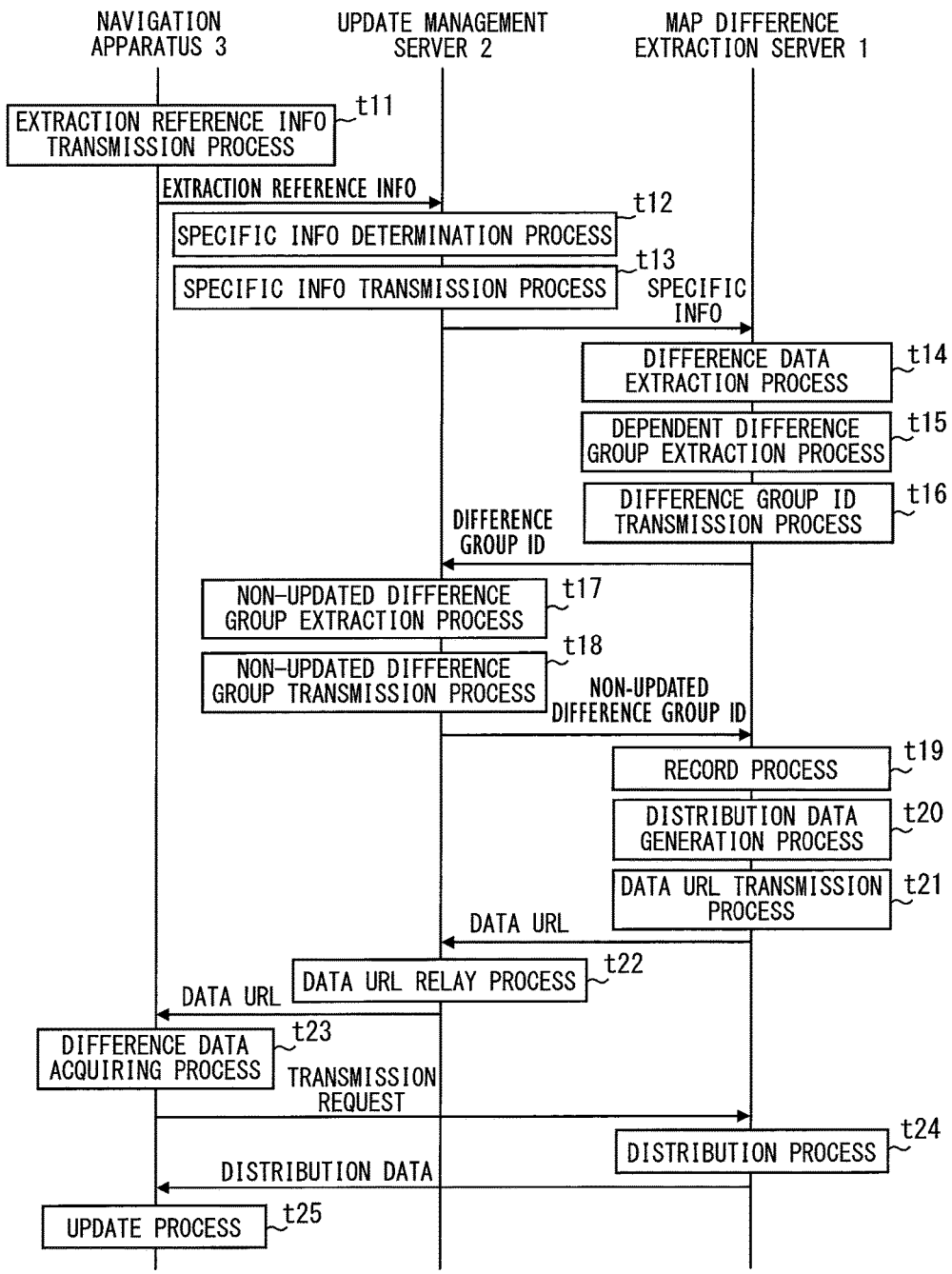
FIG. 8 is a sequence diagram showing an example of a process which is executed by the map difference data distribution system for distributing the map difference data items.

The following will describe a flow of process related to distribution of map difference data items, which is executed by the map difference data distribution system 100, with reference to the sequence diagram of FIG. 8.

t11. Extraction Reference Information Transmission Process (Navigation Apparatus 3)

The extraction reference information transmission unit 412 of the controller 41 of the navigation apparatus 3 performs extraction reference information transmission process (t11). The extraction reference information transmission process is performed in response to a detection of a predetermined trigger. The predetermined trigger is, for example, turning on of the ACC power supply of a subject vehicle or setting of a destination on the navigation apparatus 3. Turning on of the ACC power supply of a subject vehicle may be detected based on a signal representing the on state or off state of the ACC power supply acquired via the external input interface 33.

In the extraction reference information transmission process, information (hereinafter, extraction reference information) which is used by the map difference extraction server 1 and update management server 2 for extracting map difference data items is transmitted to the update management server 2 via the communication device 31. Herein, the map difference data items are data items that are necessary for updating the map data included in the map database 34 of the navigation apparatus 3.

For example, when turning on of the ACC power supply of a subject vehicle is detected, the extraction reference information transmission unit 412 transmits the extraction reference information including a user position detected by the position detector 32, a version of map data in the map database 34, and identification information for identifying a transmission source. The identification information for identifying a transmission source may be a vehicle ID, or an equipment ID of the navigation apparatus 3 or the communication device 31. In the following description, it is assumed that the identification information is the equipment ID.

When designation of a destination is detected, the extraction reference information transmission unit 412 transmits the extraction reference information including a user position detected by the position detector 32, coordinates (latitude and longitude) of the destination, a version of the map data in the map database 34, and the equipment ID. When a via point is designated in addition to the destination, the extraction reference information transmission unit 412 transmits the extraction reference information further including coordinates (latitude and longitude) of the via point. Hereinafter, a process performed in response to the detection of the turning on of the ACC power supply of the subject vehicle is referred to as process performed in response to turning on of ACC power supply, and process performed in response to the detection of the designation of the destination is referred to as process performed in response to destination designation.

t12. Specific Information Determination Process (Update Management Server 2)

When the management server side controller 23 of the update management server 2 receives extraction reference information, which is transmitted from the navigation apparatus 3, via the management server side communication unit 21, the specific information determination unit 231 of the management server side controller 23 performs specific information determination process (t12).

In specific information determination process, specific information to be transmitted to the map difference extraction server 1 is determined based on received extraction reference information. For example, the specific information may include a latitude and longitude indicating a base point or the number of release times. In the specific information determination process, whether a version of map data included in the extraction reference information is identical to a version corresponding to the number of distributed release times stored in the update management database 22 is decided. When the version of map data included in the extraction reference information is identical or older than the version corresponding to the number of distributed release times stored in the update management database 22, the number of release times is used as the number of release times of the specific information. The management server side controller 23 is configured to include, in advance, information indicating a correspondence relationship between versions of map data items and map data release times.

When the version of map data included in the extraction reference information is newer than the version corresponding to the number of distributed release times stored in the update management database 22, the number of release times associated with the version of map data included in the extraction reference information is used as the number of release times of the specific information. A situation in which the version of map data included in the extraction reference information is newer than the version associated with the number of distributed release times is such that a user has purchased map data of a latest version and the map data of the latest version is stored in the map database 34.

In specific information determination process performed in response to turning on of ACC power supply, specific information including a latitude and longitude of a user position and the number of release times is determined. In specific information determination process performed in response to destination designation, specific information including a latitude and longitude of a user position, a latitude and longitude of a destination, and the number of release times is determined. When the via point is designated in addition to the destination, specific information further including a latitude and longitude of the via point is determined.

t13. Specific Information Transmission Process (Update Management Server 2)

The specific information transmission unit 232 of the management server side controller 23 of the update management server 2 performs specific information transmission process for transmitting specific information, which is determined in the foregoing specific information determination process, to the map difference extraction server 1 via the management server side communication unit 21 (t13).

t14. Difference Data Extraction Process (Map Difference Extraction Server 1)

When the extraction server side controller 13 of the map difference extraction server 1 receives the specific information, which is transmitted from the update management server 2, via the extraction server side communication unit 11, the difference data extraction unit 131 of the extraction server side controller 13 performs difference data extraction process (t14).

In difference data extraction process, difference groups whose difference group IDs are transmitted to the update management server 2 are extracted from map difference data items, which are stored in the map difference database 12, on the basis of received specific information. The following will describe an extraction example of the difference groups.

In the difference data extraction process, regardless of the specific information determination process is performed in response to turning on of the ACC power supply or in response to the designation of destination, from difference groups (hereinafter referred to as nationwide distribution-intended difference groups) including data items corresponding to map elements located over a wide range, such as, expressways and map elements whose update is desirable for all users, nationwide distribution-intended difference groups included in a release whose release time is larger than a release time included in the specific information are extracted. Namely, nationwide distribution-intended difference groups included in a release that has not been distributed are extracted. For example, a difference group including a link whose road type is an expressway is determined as a nationwide distribution-intended difference group by the difference data extraction unit 131. A difference group ID of a nationwide distribution-intended difference group is referred to as a nationwide distribution ID.

In difference data extraction process performed in response to turning on of the ACC power supply, a division ID of a division is calculated. Herein, at least part of the division is included in a predetermined rectangular range (hereinafter, requested rectangular range), which is centered on the latitude and longitude of a user position. Herein, the user position is included in the specific information. The predetermined rectangular range is a range of, for example, 10 km long in both east-west and north-south directions. Difference groups (hereinafter, personal distribution difference groups) that are included in a division identified by the calculated division ID are extracted. Herein, the extracted difference groups are included in a release whose time is larger than a release time included in the specific information. A difference group whose ID is a duplicate of a difference group ID of a nationwide distribution-intended difference group is not extracted.

In difference data extraction process performed in response to destination designation, a division ID of a division is calculated. Herein, at least part of the division is included in a requested rectangular range centered on the latitude and longitude of a user position or the latitude and longitude of a destination. Herein, the user position and the destination position are included in the specific information. When the latitude and longitude of a via point are additionally included in the specific information, a division ID of a division at least part of which is included in the requested rectangular range centered on the latitude and longitude of the via point is additionally calculated.

Route search is implemented for a route from a user position to a destination, and a division ID of a division in which the searched route exists is calculated. The route search is carried out using a known method. Difference groups, which are included in a division identified by the calculated division ID and are included in a release whose release time is larger than a release time included in specific information, are extracted. The difference groups are also referred to as personal distribution difference groups. A difference group whose ID is a duplicate of a difference group ID of a nationwide distribution-intended difference group is not extracted. A difference group ID of a personal distribution difference group is also referred to as a personal distribution ID.

t15. Dependent Difference Group Extraction Process (Map Difference Extraction Server 1)

The dependent difference group extraction unit 132 performs dependent difference group extraction process for extracting difference groups that have a dependent relationship to difference groups extracted in the difference data extraction process or nationwide distribution-intended difference groups (t15). In the dependent difference group extraction process, difference groups (hereinafter, dependent difference groups) having the dependent relationship to difference groups extracted in the difference data extraction process or the nationwide distribution-intended difference groups are extracted from difference groups included in a release whose release time is larger than a release time included in specific information.

When one difference group is repeatedly extracted as dependent difference group having a dependent relationship with the difference group extracted in the difference data extraction process or with the nationwide distribution-intended difference group, the difference group repeatedly extracted from the second time or later is deactivated. A difference group ID of a dependent difference group is referred to as a dependent difference ID.

When no difference group is extracted in the difference data extraction process, an outcome signifying that no difference group is found is returned to the update management server 2. When no difference group is found, the process of t15 and the following processes are canceled without being executed.

t16. Difference Group ID Transmission Process (Map Difference Extraction Server 1)

The difference group ID transmission unit 133 of the extraction server side controller 13 of the map difference extraction server 1 performs difference group ID transmission process (t16). In the difference group ID transmission process, personal distribution IDs of personal distribution difference groups which are extracted in difference data extraction process, nationwide distribution IDs of nationwide distribution-intended difference groups which are extracted in difference data extraction process, and dependent difference IDs of dependent difference groups extracted in dependent difference group extraction process are transmitted to the update management server 2 via the extraction server side communication unit 11.

t17. Non-Updated Difference Group Extraction Process (Update Management Server 2)

When the management server side controller 23 of the update management server 2 receives, via the management server side communication unit 21, personal distribution IDs, nationwide distribution IDs, and dependent difference IDs, which are transmitted from the map difference extraction server 1, the non-updated data extraction unit 233 of the management server side controller 23 performs non-updated difference group extraction process (t17).

In non-updated difference group extraction process, difference groups that are not distributed to the navigation apparatus 3 (hereinafter, a non-updated difference group) are extracted from difference groups identified by the received personal distribution IDs, nationwide distribution IDs, and dependent difference IDs. For example, difference group IDs except a difference group ID of a distributed difference group, which are included in a release of a release time whose distribution is not yet completed and which are stored in the update management database 22, are extracted from the received personal distribution IDs, nationwide distribution IDs, and dependent difference IDs. With this configuration, non-updated difference groups are extracted.

When no non-updated difference group is extracted in non-updated difference group extraction process, an outcome signifying that no non-updated difference group is found is returned to the map difference extraction server 1. When no non-updated difference group is found, process of t17 and the following processes are canceled without being executed.

t18. Non-Updated Difference Group Transmission Process (Update Management Server 2)

The non-updated data transmission unit 234 of the management server side controller 23 of the update management server 2 performs non-updated difference group transmission process (t18). In the non-updated difference group transmission process, difference group IDs of non-updated difference groups extracted in non-updated difference group extraction process are transmitted to the map difference extraction server 1 via the management server side communication unit 21. The difference group ID of a non-updated difference group is also referred to as a non-updated group ID. The non-updated difference group corresponds to non-updated data.

t19. Record Process (Map Difference Extraction Server 1)

When the extraction server side controller 13 of the map difference extraction server 1 receives non-updated group IDs, which are transmitted from the update management server 2, via the extraction server side communication unit 11, the grouping unit 134 of the extraction server side controller 13 performs a record process (t19).

In the record process, from the non-updated difference groups extracted in non-updated difference group extraction process, non-updated difference groups that have a dependent relationship and are included in the same release are grouped based on pieces of information related to the relationships of dependency included in map difference data items stored in the map difference database 12. The group including the selected non-updated difference groups is referred to as a record.

Figure 9:
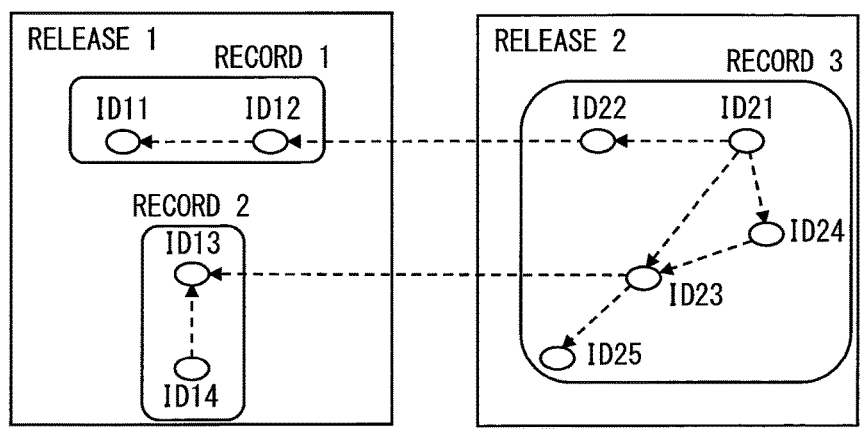
FIG. 9 is a schematic diagram indicating a record process.

The following will describe an example of grouping to be performed in the record process with reference to FIG. 9. In FIG. 9, suppose that non-updated groups in release 1 include four difference groups having difference group IDs 11 to 14 (simply, ID 11 to ID 14) and non-updated groups in release 2 include five difference groups having difference group IDs 21 to 25 (simply ID 21 to ID 25). As for a dependent relationship, a front end of an arrow indicated by a dashed line represents a parent, and a root of the arrow indicated by a dashed line represents a child.

The following will describe the dependent relationship of the non-updated groups in the example shown in FIG. 9. The difference group having ID 11 is a parent and the difference group having ID 12 is a child of the parent difference group having ID 11, and the difference group having ID 13 is a parent and the difference group having ID 14 is a child of the parent difference group having ID 13. The difference group having ID 12 is a parent and the difference group having ID 22 is a child of the parent difference group having ID 12, and the difference group having ID 13 is a parent and the difference group having ID 23 is a child of the parent difference group having ID 13. Further, the difference group having ID 22 is a parent and the difference group having ID 21 is a child of the parent difference group having ID 22. The difference group having ID 25 is a parent and the difference group having ID 23 is a child of the parent difference group having ID 25. The difference group having ID 23 is a parent and the difference groups having IDs 24 and 21 are children of the parent difference group having ID 23. The difference group having ID 24 is a parent and the difference group having ID 21 is a child of the parent difference group having ID 24.

In this case, the difference groups having IDs 11 and 12 and having a dependent relationship in release 1 are a minimal unit and are grouped as a record. Similarly, the difference groups having IDs 13 and 14 are grouped as a record. The record including the difference groups having IDs 11 and 12 grouped is referred to as record 1, and the record including the difference groups having IDs 13 and 14 grouped is referred to as record 2. The difference groups having IDs 21 to 25 and having a dependent relationship in release 2 are a minimal unit and are grouped as a record. The record including the difference groups having IDs 21 to 25 grouped is referred to as record 3.

A nationwide distribution-intended difference group is intended to be distributed to all users in nationwide but is not intended for an individual user. Prior to record process of t19, difference groups having a dependent relationship in the same-time release are grouped as a record. In other words, the difference groups are grouped in advance without waiting until the map difference extraction server 1 receives specific information associated with an individual user.

When all of grouped difference groups are non-updated groups, the grouped difference groups may be considered as a record. When difference groups that are grouped in advance include a difference group that is not a non-updated group, the non-updated difference group may be removed and the remaining non-updated difference groups from is considered as a record.

Accordingly, it becomes unnecessary to group nationwide distribution-intended difference groups each time specific information associated with an individual user is received. Therefore, a processing time or processing load of the map difference extraction server 1 can be reduced.

t20. Distribution Data Generation Process (Map Difference Extraction Server 1)

The distribution data generation unit 135 of the extraction server side controller 13 of the map difference extraction server 1 performs distribution data generation process (t20). In the distribution data generation process, records each having difference groups grouped in the record process are arranged in chronological order of a version so that the records satisfy a specified restriction of communication traffic volume. Records in an older version may be referred to as records in a release of a smaller release time.

In distribution data generation process, distribution data is generated by sequentially arranging records included in the same version so that the size of the records satisfy a specified restriction of the communication traffic volume. Further, a record including data of a map element having a higher priority under a predetermined condition (hereinafter, a priority determination condition) is arranged before a record including data of a map element having a lower priority under the priority determination condition. The priority determination condition is a condition defined so that a higher priority will be given to a map element presumed to be more necessitated by a user.

For example, a correspondence relationship between the road type and the priority (hereinafter, a road type correspondence relationship) may be adopted as the priority determination condition. For example, a map element having a road type of highway may be set to have a higher priority than a map element having a road type of street in the road type correspondence relationship. More particularly, a correspondence relationship that has a high priority may be set as an expressway such as a public superhighway or a public fast highway, a correspondence relationship that has an intermediate priority may be set as a relatively wide road other than the expressway, such as, a national highway, provincial highway, prefectural highway, or rural (municipal) highway, and a correspondence relationship that has a low priority may be set as a relatively narrow road such as a street or local road.

An expressway is a road type of a map element, which exist over a wide range and is probably desired to be updated by all users, and is therefore estimated as a road most necessitated by a user. A relatively wide road other than the expressway, such as, a national highway, provincial highway, prefectural highway, or rural highway is easier to travel than a street, and is presumed to have a higher possibility of being utilized by a user than the street. Thus, the relatively wide road other than the expressway is estimated as a road highly necessitated next to the expressway by a user. A relatively narrow road such as the street is hard to travel, and is presumed to have a lower possibility of being utilized by a user, and is therefore estimated as a road least necessitated by a user. When the road type correspondence relationship is adopted as a priority determination condition, a map element presumed to be more necessitated by a user will be given a higher priority.

Since a road type of nationwide distribution-intended difference groups is an expressway, a higher priority is given to the nationwide distribution-intended difference groups than to difference groups whose road type is not the expressway. In distribution data, a record including the nationwide distribution-intended difference group is therefore arranged prior to a record that does not include the nationwide distribution-intended difference group.

As a priority determination condition, a correspondence relationship (hereinafter, a distance correspondence relationship) that assigns a higher priority to a map element, which has a shorter distance from a user position, may be adopted. The distance of a map element from a user position is acquired by the extraction server side controller 13 which calculates a straight distance of the coordinates of the map element from the coordinates of the user position included in the specific information. For example, map elements may be assigned with low, intermediate, and high priority levels with a decrease in the distance from the map element to the user position.

A map element having a shorter distance from a user position is presumed to have a high possibility of being utilized by a user. Therefore, when the distance correspondence relationship is adopted as a priority determination condition, a map element presumed to be more necessitated by a user is given a higher priority.

As a priority determination condition, a correspondence relationship (hereinafter, a use frequency correspondence relationship) that assigns a higher priority to a map element whose use frequency is higher may be adopted. As the use frequency of a map element, a use frequency determined by the use frequency determination unit 130 is adopted. For example, map elements may be assigned with high, intermediate, and low priority levels with a decrease of use frequencies.

A map element whose use frequency by other users is higher is presumed to have a higher possibility of being utilized by a user. Therefore, when a use frequency correspondence relationship is adopted as a priority determination condition, a higher priority is given to a map element that is presumed to be more necessitated by a user.

Further, as a priority determination condition, a correspondence relationship (hereinafter, a usage correspondence relationship) that assigns a higher priority to a map element having a specific usage may be adopted. As an example of the usage correspondence relationship, data of a map element, which is necessary for calculating a route, is assigned with a higher priority than data of a map element, which is necessary for displaying an image. The data of a map element necessary for calculating a route is presumed to be more necessitated by a user than the data of a map element necessary for displaying an image. Therefore, when the usage correspondence relationship is adopted as the priority determination condition, a higher priority is given to a map element that is presumed to be more necessitated by a user.

When the distribution data generation unit 135 adopts multiple correspondence relationships as a priority determination condition, the distribution data generation unit 135 may determine the order of records, which are included in the same version, in distribution data, on the basis of priorities determined using the multiple correspondence relationships.

For example, when the same priority determined according to a road type correspondence relationship is given to records, but different priorities determined according to the distance correspondence relationship are given to the records, the record given a higher priority according to the distance correspondence relationship is arranged prior to other records. The same applies to the use frequency correspondence relationship or the usage correspondence relationship.

When priorities of the records, which are determined based on respective correspondence relationships, differ from one another, the order of the records in distribution data is determined according to predetermined priority ranking given to the correspondence relationships. When it says that priorities differ from one another, it means that a high priority is given to a first record and a low priority is given to a second record according to a first correspondence relationship, but a low priority is given to the second record and a high priority is given to the first record according to a second correspondence relationship. The priorities of the correspondence relationships can be arbitrarily designated. For example, the priorities of the correspondence relationships may be determined in the order of the road type correspondence relationship, the distance correspondence relationship, the use frequency correspondence relationship, and the usage correspondence relationship.

A priority determination condition may be stored in a memory such as the ROM of the extraction server side controller 13 in the form of, for example, a table, or may be incorporated in a program to be executed by the extraction server side controller 13.

A specified communication traffic volume is may be properly set as, for example, 3M bytes. Distribution data is generated so that the communication traffic volume of compressed distribution data can satisfy the restriction of the specified communication traffic volume. Records that exceed the specified communication traffic volume are arranged in chronological order of a version in order to generate the next distribution data. Records included in the same version are sequentially arranged so that a record including data of a map element to which a higher priority determined under a priority determination condition is given will be arranged prior to other records, whereby distribution data is generated.

Figure 10:
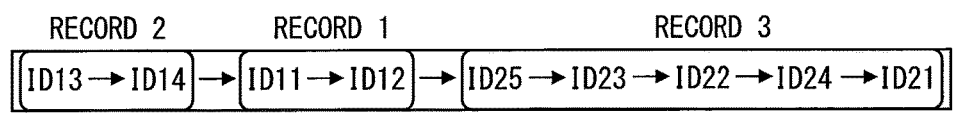
FIG. 10 is a schematic diagram indicating a distribution data generation process.

The following will describe an example of generation of distribution data in distribution data generation process with reference to FIG. 10. In FIG. 10, suppose that non-updated difference groups are grouped into records like the ones shown in FIG. 9. In the example shown in FIG. 10, each of difference groups in record 1 includes a link whose road type is a street, and each of difference groups in record 2 includes a link whose road type is an expressway.

In distribution data, records are arranged in chronological order of a version. Therefore, the records are arranged so that records 1 and 2 are arranged prior to record 3. As for records in the same-time release, a record including data of a map element to which a higher priority determined under the priority determination condition is given is arranged prior to the a record including data of a map element to which a lower priority determined under the priority determination condition. Distribution data is generated in above-described manner.

In the example shown in FIG. 10, each of the difference groups in record 1 does not include a link whose road type is an expressway, but each of the difference groups in record 2 includes the link whose road type is an expressway. Therefore, record 2 includes data items of map elements to which a higher priority is given than a priority given to data items included in record 1. Accordingly, the records are arranged so that record 2 comes prior to record 1. In each of the records, difference groups are arranged so that a difference group regarded as a parent having a larger number of children comes prior to a difference group regarded as a parent having a smaller number of children.

As a result, as shown in FIG. 10, distribution data is generated by sequentially arranging record 2, record 1, and record 3 in the description order. In record 2, difference groups having ID 13 and ID 14 are arranged in description order. In record 1, difference groups having ID 11 and ID 12 are arranged in description order. In record 3, difference groups having ID 25, ID 23, ID 22, ID 24, and ID 21 are arranged in description order. Distribution data generated in distribution data generation process is stored in a nonvolatile memory having a large storage capacity, such as, an HDD, which is not shown.

t21. Data URL Transmission Process (Map Difference Extraction Server 1)

The data URL transmission unit 136 of the extraction server side controller 13 of the map difference extraction server 1 performs data URL transmission process (t21). In the data URL transmission process, a data URL that is an address of distribution data stored in a memory after being generated in distribution data generation process, and difference group IDs of non-updated groups included in the distribution data are transmitted to the update management server 2 via the extraction server side communication unit 11.

t22. Data URL Relay Process (Update Management Server 2)

When the management server side controller 23 of the update management server 2 receives the data URL, which is transmitted from the map difference extraction server 1, via the management server side communication unit 21, the data URL relay unit 235 of the management server side controller 23 performs data URL relay process (t22). In the data URL relay process, the received data URL is transmitted to the navigation apparatus 3 via the management server side communication unit 21.

The management server side controller 23 stores difference group IDs, which are transmitted from the map difference extraction server 1, in the update management database 22 as distributed difference group IDs.

t23. Difference Data Acquisition Process (Navigation Apparatus 3)

When the controller 41 of the navigation apparatus 3 receives a data URL, which is transmitted from the update management server 2, via the communication device 31, the difference data acquiring unit 413 of the controller 41 performs difference data acquisition process (t23). In the difference data acquisition process, an address of the received data URL is accessed in order to request transmission of distribution data stored at the address.

t24. Distribution Process (Map Difference Extraction Server 1)

The distribution unit 137 of the extraction server side controller 13 of the map difference extraction server 1 performs distribution process (t24). In the distribution process, distribution data requested in difference data acquisition process is distributed to the navigation apparatus 3 via the extraction server side communication unit 11. In the distribution process, when multiple distribution data items are generated in distribution data generation process, the distribution data items are sequentially distributed so that distribution data including records in an older version is distributed prior to other distribution data, and distribution data including data of a map element to which a higher priority determined under a priority determination condition is given is distributed prior to other distribution data.

t25. Update Process (Navigation Apparatus 3)

After the controller 41 of the navigation apparatus 3 receives distribution data, which is distributed from the map difference extraction server 1, via the communication device 31, the update unit 414 of the controller 41 performs update process (t25). In the update process, each time map data needed by an application program (hereinafter, guide application) that gives guidance on the basis of the map data is read from the map database 34 of the navigation apparatus 3, the map data read from the map database 34 is synthesized with received distribution data (that is, map difference data items).

Distribution data generated in distribution data generation process may be stored in a server other than the map difference extraction server 1. In this case, in difference data acquisition process, the navigation apparatus 3 requests the server, in which distribution data is stored, to transmit the distribution data, and the server in which the distribution data is stored distributes the distribution data in response to the transmission request.

Referring to the sequence diagram of FIG. 8, an example in which the navigation apparatus 3 receives map difference data items distributed from the map difference extraction server 1 has been described. The present disclosure is not limited to this configuration. For example, a memory card in which the map database 34 is included may be connected to a personal computer (PC), the PC may receive map difference data items distributed from the map difference extraction server 1, then the map difference data items received by the PC may be stored in the memory card. In this case, the PC to which the memory card in which the map database 34 is formed is connected corresponds to a map data maintaining device.

When a PC other than the navigation apparatus 3 receives the distributed map difference data items, the requested rectangular range may be provided by a district in which a user's residence exists. For another example, a province in which the user's residence exists may be used instead of the district in which the user's residence exists. The district or province in which the user's residence exists may be stored in advance in a memory of the map difference extraction server 1 in association with the user ID.

7. Overview of First Embodiment

According to the configuration of the first embodiment, map data can be updated in units of a record, which is a minimal unit in the same time release (that is, the same version) in which a dependent relationship is guaranteed, so that a non-updated difference group that becomes incompatible with data of other map element unless the date of other map element is updated beforehand will be updated prior to other difference groups. Therefore, the map data can be updated in the minimal unit that keeps updated map elements from becoming incompatible with each other.

As for records included in the same version, the records are sequentially distributed so that a record including data of a map element to which a higher priority determined under a priority determination condition is given will be distributed prior to other records. The priority determination condition is a condition under which a higher priority is given to a map element that is presumed to be more necessitated by a user. According to the configuration of the first embodiment, map data is updated so that a non-updated difference group including data of a map element that is presumed to be more necessitated by a user will be updated prior to other non-updated difference groups.

Therefore, when a restriction is imposed on a communication traffic volume for distribution of map difference data items, the data size of map difference data items to be distributed can be reduced to a size conformable to the restriction and updated map elements can maintain compatibility with one another. At the same time, a map element that is more necessitated by a user can be updated at a higher priority.

8. First Modification

In the first embodiment, the map difference data distribution system 100 includes the map difference extraction server 1 and update management server 2, and the map difference extraction server 1 and update management server 2 are separated from one another. The present disclosure is not limited to this configuration. For example, the map difference data distribution system 100 may include a server having the capabilities of both the map difference extraction server 1 and update management server 2. That is, the map difference data distribution system 100 may include the server in which the map difference extraction server 1 and update management server 2 are integrated.

9. Second Modification

In the first embodiment, the map difference data distribution system 100 does not include a server (hereinafter, map difference data production server) that generates map difference data items using map data, which is not updated, and map data, which has been updated, in response to every update of map data. The present disclosure is not limited to this configuration. For example, the map difference data distribution system 100 may include a map difference data production server. The map difference data production server may be integrated with the map difference extraction server 1 or with the update management server 2.

The present includes the following aspects.

A map difference data distribution system in accordance with one aspect of the present disclosure includes a map difference data distribution device 1, 2 including a map difference data storage unit 12 that stores map difference data items which are a difference between map data of a version in which data items of map elements are not updated, and map data of a version in which the data items of map elements have been updated, and a distribution unit 137 that distributes the map difference data items stored in the map difference data storage unit, and a map data maintaining device 3 including an update unit 414 that updates a subject map data, which is to be used by the own device, on the basis of the map difference data items to be distributed from the distribution unit. The map difference data storage unit stores, in addition to data items of map elements updated into the version, as difference map data items updates of data items of map elements even in a different version which have a dependent relationship to data items of other map elements, that is, which become incompatible with the data items of other map elements unless the data items of other map elements are updated beforehand in case the data items of map elements are updated. The map difference data distribution device includes a non-updated data extraction unit 233 that extracts certain non-updated data items, which are data items of map elements that have not been updated in the map data maintaining device, from the map difference data items stored in the map difference data storage unit, a grouping unit 134 that groups data items of map elements having a dependent relationship in the same version, and a distribution data generation unit 135 that arranges records, each of which is a set of non-updated data items grouped by the grouping unit, so that the records can be conformable to a specified communication traffic volume, sequentially arranges records included in the same version so that a record including data of a map element to which a higher priority determined under a condition under which a priority of data of a map element is determined is given will be arranged prior to other records, and thus generates distribution data to be distributed by the distribution unit. The distribution unit distributes map difference data items by distributing the distribution data generated by the distribution data generation unit.

Accordingly, since non-updated data items having a dependent relationship in the same version are grouped, the non-updated data items can be grouped in a minimal unit in which when data items of map elements in the same version are updated, the updated map elements can be kept from becoming incompatible with one another. The minimal unit is a record.

The distribution data generation unit generates distribution unit by arranging records so that the records can be conformable to a specified communication traffic volume. Therefore, distribution data items each of which is conformable to a communication traffic volume conformable to a restriction can be generated sequentially so that distribution data including records in an older version will be generated prior to other records. Further, when the distribution unit sequentially distributes distribution data items so that distribution data including the records in an older version will be distributed prior to other records, the map data maintaining device can update map data by updating records in chronological order.

When map data is updated by updating records in chronological order of a version, even when data items of map elements that have to be updated are included in different versions, a situation in which an updated map element becomes incompatible with other map elements will not take place. This is because map data can be updated in a minimal unit in which updated map elements are kept from becoming incompatible with one another.

As for records in the same version, the distribution data generation unit sequentially arranges the records so that a record including data of a map element to which a higher priority determined under a condition under which a priority of data of a map element is determined is given will be arranged prior to other records, and thus generates distribution data to be distributed by the distribution unit. The records in the same version can therefore be distributed sequentially so that a record including data of a map element to which a higher priority determined under a condition under which a priority of data of a map element is determined is given will be distributed prior to other records. Therefore, in the map data maintaining device, map data can be updated by sequentially updating records so that a record including data of a map element to which a higher priority determined under the condition is given will be updated prior to other records. By designating a condition under which a higher priority is given to data of a map element that is presumed to be more necessitated by a user, map data can be updated by sequentially updating data items of map elements so that data of a map element which is presumed to be more necessitated by a user will be updated prior to other data of map elements.

As a result, when a restriction is imposed on a communication traffic volume for distribution of map difference data items, while the communication traffic volume of map difference data items to be distributed is conformable to a communication traffic volume conformable to the restriction, updated map elements can be kept from becoming incompatible with one another. Updating of a map element that is presumed to be more necessitated by a user can be performed by priority.

The map difference data distribution device, map data maintaining device, update management server, and map difference extraction server which are included in the present disclosure are employed in the map difference data distribution system. Accordingly, when a restriction is imposed on a communication traffic volume for distribution of map difference data items, while the communication traffic volume of map difference data items to be distributed is conformable to the communication traffic volume conformable to the restriction, updated map elements can be kept from becoming incompatible with one another. Updating of a map element that is presumed to be more necessitated by a user can be performed by priority.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A map difference data distribution system comprising:
   a map difference data distribution device including a map difference data storage unit and a distribution unit, wherein the map difference data storage unit stores map difference data items indicating differences between data items of map elements included in a version of map data before update and data items of map elements included in a version of map data after update, and the distribution unit distributes the map difference data items; and a map data maintaining device including an update unit that updates a subject map data based on the map difference data items distributed by the distribution unit, wherein the map difference data storage unit stores, as map difference data items, the updated data items of map elements and data items of map elements which have dependent relationships with the updated data items of map elements, the updated data items of map elements and the data items of map elements which have the dependent relationships with the updated data items of map elements are specified by tracing back to updates in different versions, and the dependent relationship is a relationship in which the updated data items of map elements become incompatible with other data items of map elements unless the data items of map elements which have the dependent relationships with the updated data items of map elements are updated beforehand, the map difference data distribution device includes:

a non-updated data extraction unit extracting non-updated data items from the map difference data items stored in the map difference data storage unit, and the non-updated data items being data items of map elements that are not updated in the subject map data included in the map data maintaining device;

a grouping unit grouping the updated data items of map elements and the data items of map elements which have the dependent relationships with the updated data items of map elements having a same version as a set; and a distribution data generation unit generating a distribution data, which is to be distributed by the distribution unit, by arranging records, each of which is a set of the updated data items and the data items having the dependent relationships with the updated data items grouped by the grouping unit and includes the non-updated data items in the map data maintaining device, so that a total data size of the records is conformable to a specified communication traffic volume, the distribution data generation unit sequentially arranging the records corresponding to the same version in a manner that one of the records which includes the data item of map element to which a higher priority is assigned according to a priority determination condition is arranged prior to another one of the records which includes the data item of map element to which a lower priority is assigned according to the priority determination condition, and the priority determination condition being a condition for determining a priority of the data item of map element, the distribution unit distributes, as the map difference data items, the distribution data generated by the distribution data generation unit, the distribution data generation unit generates the distribution data, which is to be distributed by the distribution unit, by arranging the records, each of which is grouped by the grouping unit and includes the non-updated data items, in chronological order of version so that the total data size of the records is conformable to the specified communication traffic volume, the distribution data generation unit sequentially arranges the records corresponding to the same version in a manner that one of the records which includes the data item of map element to which the higher priority is assigned under the priority determination condition is arranged prior to another one of the records which includes the data item of map element to which the lower priority is assigned under the priority determination condition, the distribution unit distributes the distribution data, which is generated by the distribution data generation unit and includes the record corresponding to an older version, prior to the distribution data, which is generated by the distribution data generation unit and includes the record corresponding to a later version, when the record included in one distribution data corresponds to the same version with the record included in another distribution data, the distribution unit distributes the distribution data including the data item of map element to which the higher priority is assigned prior to the distribution data including the data item of map element to which the lower priority is assigned, the update unit in the map data maintaining device updates the subject map data based on the distribution data, which is distributed by the distribution unit and includes the record corresponding to the older version, prior to the distribution data, which is distributed by the distribution unit and includes the record corresponding to the later version, and when the record included in one distribution data corresponds to the same version with the record included in another distribution data, the update unit in the map data maintaining device updates the subject map data based on the distribution data including the data item of map element to which the higher priority is assigned prior to the distribution data including the data item of map element to which the lower priority is assigned.

2. The map difference data distribution system according to claim 1, wherein the priority determination condition for determining the priority of the data item of map element is provided by a road type correspondence relationship, and the distribution data generation unit generates the distribution data, which is to be distributed by the distribution unit, by arranging the records corresponding to the same version in a manner that one of the records including the data item of map element to which the higher priority is assigned under the road type correspondence relationship is arranged prior to another one of the records including the data item of map element to which the lower priority is assigned under the road type correspondence relationship.

3. The map difference data distribution system according to claim 2, wherein, when the priority determination condition is provided by the road type correspondence relationship, the data item of map element corresponding to an expressway is assigned with the higher priority than the data item of map element corresponding to a street.

4. The map difference data distribution system according to claim 1, wherein the priority determination condition for determining the priority of the data item of map element is provided by a distance correspondence relationship in which the higher priority is assigned to the data item of map element that is disposed at a shorter distance from a current position of a user of the map data maintaining device than the data item of map element that is disposed at a longer distance from the current position of the user of the map data maintaining device, and the distribution data generation unit generates the distribution data, which is to be distributed by the distribution unit, by sequentially arranging the records corresponding to the same version in a manner that one of the records including the data item of map element that is disposed at the shorter distance from the current position of the user of the map data maintaining device is arranged prior to another one of the records including the data item of map element that is disposed at the longer distance from the current position of the user of the map data maintaining device.

5. The map difference data distribution system according to claim 1, further comprising
a use frequency determination unit determining a use frequency of the map element by collecting information related to use situations of the map element from one or more map data maintaining devices, wherein
the priority determination condition for determining the priority of the data item of map element is provided by a use frequency correspondence relationship in which the higher priority is assigned to the data item of map element that has a higher use frequency than the data item of map element that has a lower use frequency, and
the distribution data generation unit generates the distribution data, which is to be distributed by the distribution unit, by sequentially arranging the records corresponding to the same version in a manner that one of the records including the data item of map element that has the higher use frequency is arranged prior to another one of the records including the data item of map element that has the lower use frequency.

6. The map difference data distribution system according to claim 1, wherein
the priority determination condition for determining the priority of the data item of map element is provided by a usage correspondence relationship in which a higher priority is assigned to the data item of map element that has a specific usage, and
the distribution data generation unit generates the distribution data, which is to be distributed by the distribution unit, by sequentially arranging the records corresponding to the same version in a manner that one of the records including the data item of map element that has the specific usage is arranged prior to another one of the records including the data item of map element that has a usage different from the specific usage.

7. The map difference data distribution system according to claim 1, wherein
the map difference data distribution device includes a determination reference information storage unit that stores determination reference information which is referred to for determining the map difference data items have been distributed to the map data maintaining device, and
the non-updated data extraction unit extracts the non-updated data items with reference to the determination reference information stored in the determination reference information storage unit.

8. The map difference data distribution system according to claim 7, wherein
the map difference data distribution device includes:
an update management server including the non-updated data extraction unit and the determination reference information storage unit; and
a map difference extraction server including the map difference data storage unit, the grouping unit, the distribution data generation unit, and the distribution unit.

9. The map difference data distribution system according to claim 1, wherein
the non-updated data extraction unit extracts the non-updated data items in response to a receipt of predetermined signal from the map data maintaining device, and,
when the non-updated data extraction unit extracts the non-updated data items, the grouping unit groups the extracted non-updated data items, which have the dependent relationships in the same version, as one set.

10. The map difference data distribution system according to claim 1, wherein
the map difference data distribution device includes:
an update management server including the non-updated data extraction unit; and
a map difference extraction server including the map difference data storage unit, the grouping unit, the distribution data generation unit, and the distribution unit.

11. An update management server utilized in the map difference data distribution system according to claim 10.

12. A map difference extraction server utilized in the map difference data distribution system according to claim 10.

13. A map difference data distribution device utilized in the map difference data distribution system according to claim 1.

14. A map data maintaining device utilized in the map difference data distribution system according to claim 1.

15. A map difference data distribution system comprising:
a map difference data distribution device including a map difference data storage unit and a distribution unit, wherein the map difference data storage unit stores map difference data items indicating differences between data items of map elements included in a pre-update version of map data and data items of map elements included in a post-update version of map data, and the distribution unit distributes the map difference data items; and
a map data maintaining device including an update unit that updates a subject map data based on the map difference data items distributed by the distribution unit, wherein
the map difference data storage unit stores, as map difference data items, the data items of map elements updated from the pre-update version to the post-update version and data items of map elements which have dependent relationships with the data items of map elements updated from the pre-update version to the post-update version, the data items of map elements updated from the pre-update version to the post-update version and the data items of map elements which have dependent relationships with the data items of map elements updated from the pre-update version to the post-update version are specified by tracing back to the update of the data items having the dependent relationships, and the dependent relationship is a relationship in which the data items of map elements updated from the pre-update version to the post-update version become incompatible with other data items of map elements unless the data items of map elements which have the dependent relationships with the data items of map elements updated from the pre-update version to the post-update version are updated beforehand,
the map difference data distribution device includes:
a non-updated data extraction unit extracting non-updated data items from the map difference data items stored in the map difference data storage unit, and the non-updated data items being data items of map elements that are not updated in the subject map data included in the map data maintaining device;

a grouping unit grouping the data items of map elements updated from the pre-update version to the post-update version and the data items of map elements which have the dependent relationships with the data items of map elements updated from the pre-update version to the post-update version in the post-update version as a set; and a distribution data generation unit generating a distribution data, which is to be distributed by the distribution unit, by arranging records, each of which is a set of the updated data items and the data items having the dependent relationships with the updated data items grouped by the grouping unit and includes the non-updated data items in the map data maintaining device, so that a total data size of the records is conformable to a specified communication traffic volume, the distribution data generation unit sequentially arranging the records corresponding to the post-update version in a manner that one of the records which includes the data item of map element to which a higher priority is assigned according to a priority determination condition is arranged prior to another one of the records which includes the data item of map element to which a lower priority is assigned according to the priority determination condition, and the priority determination condition being a condition for determining a priority of the data item of map element, the distribution unit distributes, as the map difference data items, the distribution data generated by the distribution data generation unit, the distribution data generation unit generates the distribution data, which is to be distributed by the distribution unit, by arranging the records, each of which is grouped by the grouping unit and includes the non-updated data items, in chronological order of version so that the total data size of the records is conformable to the specified communication traffic volume, the distribution data generation unit sequentially arranges the records corresponding to the same version in a manner that one of the records which includes the data item of map element to which the higher priority is assigned under the priority determination condition is arranged prior to another one of the records which includes the data item of map element to which the lower priority is assigned under the priority determination condition, the distribution unit distributes the distribution data, which is generated by the distribution data generation unit and includes the record corresponding to an older version, prior to the distribution data, which is generated by the distribution data generation unit and includes the record corresponding to a later version, when the record included in one distribution data corresponds to the same version with the record included in another distribution data, the distribution unit distributes the distribution data including the data item of map element to which the higher priority is assigned prior to the distribution data including the data item of map element to which the lower priority is assigned, the update unit in the map data maintaining device updates the subject map data based on the distribution data, which is distributed by the distribution unit and includes the record corresponding to the older version, prior to the distribution data, which is distributed by the distribution unit and includes the record corresponding to the later version, and when the record included in one distribution data corresponds to the same version with the record included in another distribution data, the update unit in the map data maintaining device updates the subject map data based on the distribution data including the data item of map element to which the higher priority is assigned prior to the distribution data including the data item of map element to which the lower priority is assigned.

* * * * *